UNITED STATES PATENT OFFICE.

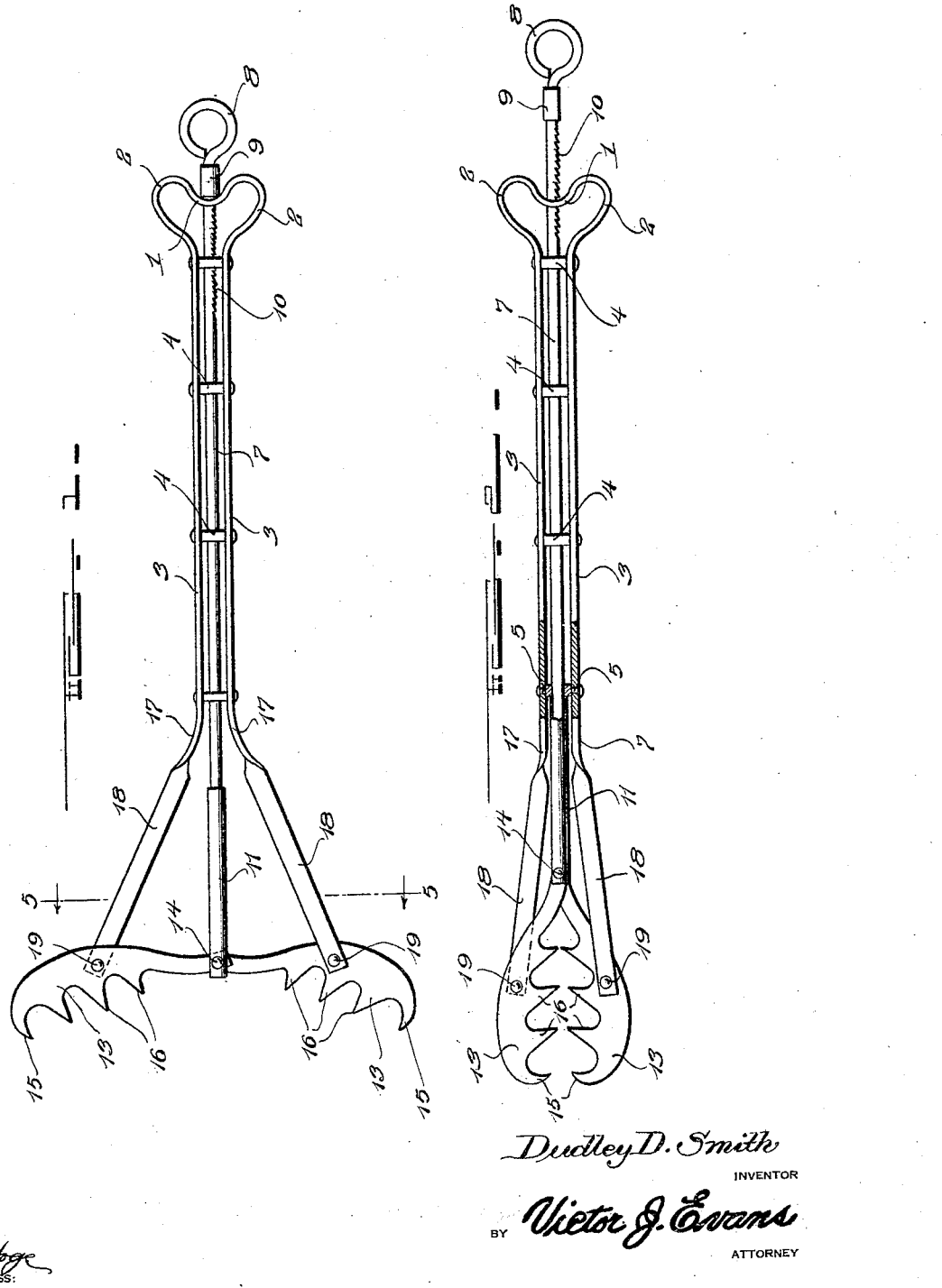

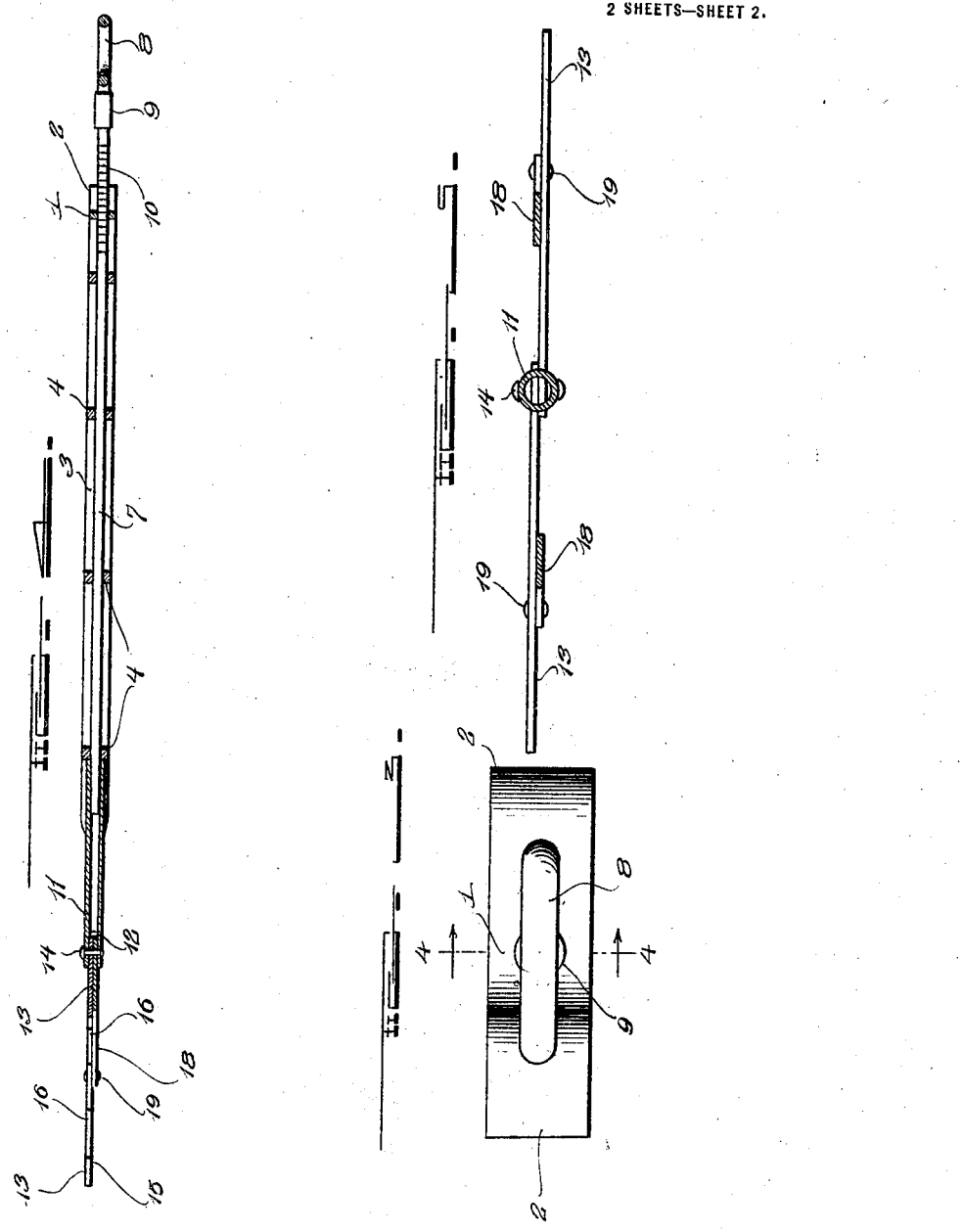

DUDLEY D. SMITH, OF PERRY, NEW YORK.

FISH GAFF.

1,413,139.  Specification of Letters Patent.  Patented Apr. 18, 1922.

Application filed July 31, 1920. Serial No. 400,297.

*To all whom it may concern:*

Be it known that I, DUDLEY D. SMITH, a citizen of the United States, residing at Perry, in the county of Wyoming and State of New York, have invented new and useful Improvements in Fish Gaffs, of which the following is a specification.

My present invention has reference to an improved fish gaff, and may be considered in the nature of an improvement upon the construction on which I was granted United States Letters-Patent No. 1,187,193, dated June 13, 1916.

Other objects and advantages will present themselves as the nature of the invention is better understood, reference being had to the drawings in which there is illustrated a satisfactory embodiment of the improvement reduced to practice.

In the drawings:—

Figure 1 is a side elevation of the improvement, the jaws being open.

Figure 2 is a similar view, with parts in section, and showing the jaws closed.

Figure 3 is a rear end elevation.

Figure 4 is a sectional view approximately on the line 4—4 of Figure 3.

Figure 5 is a transverse sectional view approximately on the line 5—5 of Figure 1.

The handle of my improved gaff is constructed from a single piece of flat spring metal which is centrally depressed or rounded upon itself as at 1, and from thence downwardly and outwardly as at 2, the ends of the last mentioned rounded portions being disposed in parallelism and providing the side members 3 of the handle. The side members are retained in spaced relation through the medium of spaced blocks 4. The rounded portions 2 provide loop-like finger holds, and the centrally rounded portion 1 has an opening 5 therethrough which is slightly out of alignment with similar openings 6 in the spacing blocks 4. The spacing blocks preferably have their opposite ends formed with lugs 5' that pass through openings in the side members 3 of the handle, the said lugs being of ductile material and have their outer ends headed against the outer faces of the side members.

Passing longitudinally through the openings 5 and 6 is the operating rod 7 for the jaws of the device. This rod has its inner end rounded upon itself, as at 8 to provide an eye, and outward of the eye the rod has an enlargement 9 thereon which contacts with the rounded portion 1 at the finger hold end of the handle to limit the inward movement of the rod between the side members of the handle. The rod has one of its side formed with a rack surface 10, and the openings through which the rod passes in the lugs and in the end 1 of the handle are of a greater area than the cross sectional diameter of the rod. Since the opening 5 in the inwardly rounded portion 1 of the handle is slightly out of alignment with the openings 6 in the spacing blocks, the rack surface 10 of the operating rod 7 normally engages one side of the opening 5 and holds the rod against movement in an inward direction and prevents the jaws, hereinafter to be described, from opening. To permit the inward movement of the rod, the outer end thereof may be moved laterally with respect to the handle and the teeth of the rack will thus become disengaged with the side of the opening in said handle.

On the outer end of the rod 7 is secured a tubular extension 11, which contacts with one of the spaced blocks 4 and limits the inward movement of the rod between the side movement of the handle, and the said tubular extension has its outer end slotted, as at 12. In the slot are received the inner ends of the jaw members 13—13, the said jaws being pivoted to the tubular extension 11 as at 14. The jaws 13 have their outer ends hooked inwardly to provide teeth 15, but in addition to this the confronting edges of the jaws are provided with additional series of teeth 16. By this construction the operator of the gaff is not liable to lose the fish caught between the jaws. As previously stated the handle member proper is constructed from a single strip of spring metal, and the portions of the sides 3 of the said handle beyond the outer spacing block 4 exert a pressure toward each other, and such pressure is augmented by inclining the said outer ends of the sides away from each other as a result of the inward movement of the operating rod. For distinction the inclined extensions are indicated by the numeral 17, and the said extensions are bent or twisted upon themselves to arrange the outer portions thereof at a right angle with respect to the inner portions. These flat outer portions are indicated by the numeral 18, and are each pivoted, as at 19, to one of the jaw members 13.

In the operation of the device, assuming that the jaws are normally closed, the outer end of the operating rod is moved laterally with respect to the handle thus disengaging its rack surface with the side of the opening in the handle. The rod is then moved inwardly forcing the jaws apart against the tension of the spring elements. Loss of a fish or the like when gripped by the co-acting jaw members, is prevented by the relative position of their hook-shaped teeth influenced by the outer spring members and the engagement of the rack surface of the operating rod with the side of the opening in the handle.

It is believed that the foregoing description, when taken in connection with the drawings will render the construction, operation and advantages of the improvement perfectly clear to those skilled in the art to which such inventions relate. It will be noted that the device is of an extremely simple construction, and that the finger end provided by the rounded members 2 of the handle are located in comparatively close proximity to the eye end of the operating rod, so that the thumb of the operator may be passed through the eye and of the rod and two of his fingers arranged in the finger holds 2, and thus a pressure may be exerted upon the rod to spread the jaws and to permit of the spring sides exerting tension upon the jaws to close the same. The operator may also readily move the rod laterally to cause the rack teeth thereof to engage with the wall adjacent the opening of the portion 1 of the device.

Having thus described the invention, what I claim is:—

A gaff having a handle portion constructed from a single strip of spring material centrally incurved and from thence rounded outwardly to provide finger holds, the side members extending from the finger holds being retained in parallelism by spacing elements, the portions of the sides beyond the outer spacing element being bent to provide flat extensions, co-acting jaws, each of which is pivoted to one of said extensions, a rod freely slidable through the handle between the finger holds thereof and through the spacing elements for the sides of the handle, a rack surface on said rod designed, when the rod is moved laterally to engage with the wall of the opening provided in the handle through which said rod passes, the inner end of the rod having an eye, and an element thereon for contacting with the handle for limiting the movement of the rod through the handle in an outward direction, a tubular extension on the outer end of the rod normally contacting with the outer spacing element, and pivoted means connecting the said extension to the inner ends of the jaws.

In testimony whereof I affix my signature.

DUDLEY D. SMITH.